United States Patent
Yamakawa et al.

[11] Patent Number: 6,025,435
[45] Date of Patent: *Feb. 15, 2000

[54] THERMAL CONDUCTIVE SILICONE RUBBER COMPOSITION

[75] Inventors: Kimio Yamakawa, Chiba Prefecture; Noriyasu Yokoyama, Tokyo; Katsutoshi Mine, Chiba Prefecture, all of Japan

[73] Assignee: Dow Corning Toray Silicone Co., Ltd., Tokyo, Japan

[*] Notice: This patent is subject to a terminal disclaimer.

[21] Appl. No.: 08/654,493

[22] Filed: May 28, 1996

[30] Foreign Application Priority Data

May 29, 1995 [JP] Japan .................................... 7-153886

[51] Int. Cl.⁷ ............................. C08K 83/02; C08L 83/04
[52] U.S. Cl. ........................... 524/862; 524/430; 524/786
[58] Field of Search .................................... 524/430, 588, 524/862, 786; 252/518

[56] References Cited

U.S. PATENT DOCUMENTS

| | | | |
|---|---|---|---|
| 5,008,307 | 4/1991 | Inomata | 523/220 |
| 5,276,087 | 1/1994 | Fujiki et al. | 524/786 |

FOREIGN PATENT DOCUMENTS

| | | |
|---|---|---|
| 520746 | 12/1992 | European Pat. Off. . |
| 61157569 | 7/1986 | Japan . |
| 2041362 | 2/1990 | Japan . |
| 779788 | 11/1954 | United Kingdom . |

*Primary Examiner*—Robert Dawson
*Assistant Examiner*—D. Aylward
*Attorney, Agent, or Firm*—Paula J. Lagattuta; Larry A. Milco

[57] ABSTRACT

A thermally conductive silicone rubber composition comprised of (A) 100 parts by weight of an organopolysiloxane that contains at least two silicon-bonded alkenyl groups per molecule, (B) 0.1 to 50 parts by weight of an organohydrogenpolysiloxane that contains at least two silicon-bonded hydrogen atoms molecule, (C) 0.1 to 10 parts by weight of organosiloxane that contains at least one silicon-bonded alkoxy group per silicon-bonded hydroxyl per molecule, (D) 300 to 1200 parts by weight of fine alumina powder comprised of (i) 5 to 95 wt % of spherical or nonspherical fine powder of an average particle diameter of up to 10 $\mu$m and of (ii) 95 to 5 wt % of spherical or nonspherical fine alumina powder of an average particle diameter of 10 to 50 $\mu$m, and (E) a catalytic quantity a hydrosilylation reaction catalyst.

14 Claims, No Drawings

THERMAL CONDUCTIVE SILICONE RUBBER COMPOSITION

BACKGROUND OF THE INVENTION

1. Field of the Invention

This invention relates to thermally conductive silicone rubber compositions, and, more particularly, to thermally conductive silicone rubber compositions in which the fine alumina powder does not readily precipitate and in which the fine alumina powder can easily be uniformly redispersed if it does precipitate.

2. Description of the Related Art

As electronic devices, such as printed circuit boards and hybrid integrated circuits, that carry electronic components such as transistors, integrated circuits and memory elements have become more dense and more highly integrated in recent years, various types of thermally conductive silicone rubber compositions have been used to efficiently dissipate heat from the devices. The thermally conductive silicone rubber compositions that have been used include thermally conductive silicone rubber compositions that have been hardened by addition reactions, such as thermally conductive silicone rubber compositions that contain adhesion promoters and are comprised of organopolysiloxanes containing vinyl groups, organohydrogen polysiloxanes, fine alumina powders, an adhesion promoter and a platinum catalyst (see Japanese Patent Application Laid Open No. 61-157569 (1986)), thermally conductive silicone rubber compositions that are comprised of organopolysiloxanes containing at least 0.1 mol % of alkeny groups in the molecule, organohydrogen polysiloxanes containing at least two hydrogen atoms bonded with silicon atoms in the molecule, spherical fine alumina powder of an average particle diameter of 10 to 50 $\mu$m, spherical or nonspherical fine alumina powder of an average particle diameter of up to 10 $\mu$m and platinum or a platinum compound (see Japanese Patent Application Laid Open No. 63-251466 (1988)), thermal conductive silicone rubber compositions that are comprised of organopolysiloxanes containing alkenyl groups, organohydrogen polysiloxanes, amorphous fine alumina powder of an average particle diameter of 0.1 to 5 $\mu$m, spherical fine alumina powder of an average particle diameter of 5 to 50 $\mu$m and platinum catalysts (see Japanese Patent Application Laid Open No. 241362 (1990)) and thermally conductive silicone rubber compositions that are comprised of organopolysiloxanes containing more than an average of 0.5 alkenyl groups in the molecule, organohydrogen polysiloxane containing at least two hydrogen atoms bonded with silicon atoms in the molecule, high purity fine alumina powder of which the average particle diameter is less than 50 $\mu$m and of which the major axis-minor axis ratio was 1.0 to 1.4 and a platinum catalyst (see Japanese Patent Application Laid Open No. 5-105814 (1993)).

In order to increase the coefficient of thermal conductivity of silicone rubber that is obtained by hardening this type of thermally conductive silicone rubber composition, fine alumina powder is generally compounded in large quantities in this composition. However, because the fine alumina powder has extremely high specific gravity, it readily precipitates in the silicone rubber composition. A further problem is that it is not easy to redisperse fine alumina powder that has precipitated from the composition.

The inventors conducted intensive studies for the purpose of solving the aforementioned problems, and, as a result, they arrived at this invention.

Specifically, the objective of this invention is to provide a thermally conductive silicone rubber composition in which, in spite of the fact that a large quantity of fine alumina powder is compounded in order to form silicone rubber of high thermal conductivity, the fine alumina powder does not readily precipitate and in which the fine alumina powder can easily be uniformly redispersed even if it does precipitate.

SUMMARY OF THE INVENTION

This invention relates to thermally conductive silicone rubber compositions comprising
(A) 100 parts by weight of an organopolysiloxane containing an average of at least two silicon-bonded alkenyl groups per molecule;
(B) 0.1 to 50 parts by weight of an organohydrogenpolysiloxane containing an average of at least two silicon-bonded hydrogen atoms per molecule;
(C) 0.1 to 10 parts by weight of an organosiloxane containing an average of at least one silicon-bonded radical per molecule wherein said radical is selected from the group consisting of hydroxyl and alkoxy groups;
(D) 300 to 1200 parts by weight of a fine alumina powder comprising:
  (i) 5 to 95 parts by weight of a first fine powder having an average particle diameter that is less than or equal to 10 $\mu$m; and
  (ii) 95 to 5 parts by weight of a second fine powder having an average particle diameter from 10 to 50 pm;
  wherein said first fine powder and said second fine powder are individually selected from the group consisting of spherical and nonspherical fine powders; and
(E) a catalytic quantity of a hydrosilylation reaction catalyst.

DETAILED DESCRIPTION OF THE INVENTION

The thermally conductive silicone rubber composition of the present invention will be explained in greater detail below.

Component (A), the organopolysiloxane, is the principal agent of this composition and contains an average of at least two alkenyl groups bonded with silicon atoms per molecule. The alkenyl groups that are bonded with silicon atoms in component (A) include, for example, vinyl groups, allyl groups, butenyl groups, pentenyl groups, hexenyl groups and heptenyl groups. Of these, vinyl groups are particularly preferred. The bonding positions of the alkenyl groups in component (A) include, for example, the terminals of the molecular chain and/or side chains of the molecular chain. Organic groups that are bonded with the silicon atoms in addition to the alkenyl groups in component (A) include, for example, alkyl groups such as methyl groups, ethyl groups, propyl groups, butyl groups, pentyl groups, hexyl groups and heptyl groups, aryl groups such as phenyl groups, tolyl groups, xylyl groups and naphthyl groups, aralkyl groups such as benzyl groups and 5 phenethyl groups and halogenated groups such as chloromethyl groups, 3-chloropropyl groups and 3,3,3-trifluoropropyl groups, with methyl groups and phenyl groups being particularly preferred. The molecular structure of component (A) can be, for example, in straight chain form, a straight chain form having some branches, in cyclic form and in branched chain form, with the straight chain form being particularly desirable. Although there is no limitation on the viscosity of component (A), a viscosity, at 25° C., in the range of 10 to 500,000 centipoise is preferred, with a range of 50 to 100,000 centipoise being particularly preferred. The reasons for this are that the physical properties of the silicone rubber that is obtained deteriorate when the viscosity of component (A) at 25° C. is less than 10 centipoise and that the handling workability of the composition that is obtained is decreased when it exceeds 500,000 centipoise.

The organopolysiloxane, component (A), can include, for example, copolymers of dimethyl siloxane blocked with trimethylsiloxy groups at both terminals of the molecular chain and of methyl vinyl siloxane, methyl vinyl polysiloxane blocked with trimethylsiloxy groups at both terminals of the molecular chain, copolymers of dimethyl siloxane blocked with trimethylsiloxy groups at both terminals of the molecular chain, methyl vinyl siloxane and methyl phenyl siloxane, dimethyl polysiloxane blocked with dimethylvinyl siloxane groups at both terminals of the molecular chain, methyl vinyl polysiloxane blocked with dimethyl vinyl siloxane groups at both terminals of the molecular chain, copolymers of dimethyl siloxane blocked with dimethyl vinyl siloxane groups at both terminals of the molecular chain and of methyl vinyl siloxane, copolymers of dimethyl siloxane blocked with dimethyl vinyl siloxane groups at both terminals of the molecular chain, methyl vinyl siloxane and methyl phenyl siloxane, organopolysiloxane copolymers comprised of siloxane units as indicated by the formula $R^1{}_3SiO_{1/2}$, siloxane units as indicated by the formula $R^1{}_2R^2SiO_{1/2}$, as indicated by the formula $R^1{}_2SiO_{2/2}$ and a small quantity of siloxane units as indicated by the formula $SiO_{4/2}$, organopolysiloxane copolymers comprised of siloxane units as indicated by the formula $R^1{}_2R^2SiO_{1/2}$, siloxane units as indicated by the formula $R^1{}_2SiO_{2/2}$ and siloxane units as indicated by the formula $SiO_{4/2}$, organopolysiloxane copolymers comprised of siloxane units as indicated by the formula $R^1R^2SiO_{2/2}$, siloxane units as indicated by the formula $R^1SiO_{3/2}$ and siloxane units as indicated by the formula $R^2SiO_{3/2}$ and mixtures of two or more of these organopolysiloxanes. In the foregoing formulas, $R^1$ is a monovalent hydrocarbon group other than an alkenyl group, for example, an alkyl group such as a methyl group, an ethyl group, a propyl group, a butyl group, a pentyl group, a hexyl group or a heptyl group, an aryl group such as a phenyl group, a tolyl group, a xylyl group or a naphthyl group, an aralkyl group such as a phenethyl group or a halogenated alkyl group such as a chloromethyl group, a 3-chloropropyl group or a 3,3,3-trifluoropropyl group. In the foregoing formulas, $R^2$ is an alkenyl group, for example, a vinyl group, an allyl group, a butenyl group, a pentenyl group, a hexenyl group or a heptenyl group.

Component (B), the organohydrogenpolysiloxane, is the crosslinking agent of this composition and contains an average of at least two hydrogen atoms that are bonded to silicon atoms per molecule. The positions of bonding of the hydrogen atoms bonded with the silicon atoms in component (B) can be, for example, the terminals of the molecular chain and/or side chains of the molecular chain. Organic groups bonded with silicon atoms in component (B) include, for example, alkyl groups such as methyl groups, ethyl groups, propyl groups, butyl groups, pentyl groups, hexyl groups and heptyl groups, aryl groups such as phenyl groups, tolyl groups, xylyl groups and naphthyl groups, aralkyl groups such as phenethyl groups or halogenated alkyl groups such as chloromethyl groups, 3-chloropropyl groups or 3,3,3-trifluoropropyl groups. Methyl groups and phenyl groups are particular preferred. The molecular structure of component (B) may be, for example, in straight chain form, a straight chain form having some branches, in cyclic form and in branched chain form, with the straight chain form being particularly preferred. Although there is no limitation on the viscosity of component (B), a viscosity at 25° C. in the range of 1 to 500,000 centipoise is desirable, with a range of 5 to 100,000 centipoise being particularly preferred. The reasons for this are that the physical properties of the silicone rubber that is obtained deteriorate when the viscosity of component (B) at 25° C. is less than 1 centipoise and that the handling workability of the composition that is obtained is decreased when it exceeds 500,000 centipoise.

The organohydrogenpolysiloxane, component (B), can include, for example, methylhydrogen polysiloxane blocked with trimethylsiloxy groups at both terminals of the molecular chain, copolymers of dimethyl siloxane blocked with trimethylsiloxy groups at both terminals of the molecular chain and of methylhydrogen siloxane, copolymers of dimethyl siloxane blocked with trimethylsiloxy groups at both terminals of the molecular chain, methylhydrogen siloxane and methylphenyl siloxane, dimethyl polysiloxane blocked with dimethylhydrogen siloxane groups at both terminals of the molecular chain, dimethyl polysiloxane blocked with dimethylhydrogen siloxane groups at both terminals of the molecular chain, copolymers of dimethyl blocked with dimethylhydrogen siloxane groups at both terminals of the molecular chain, and methylphenyl siloxane, methylphenyl polysiloxane blocked with dimethylhydrogen siloxane groups at both terminals of the molecular chain, organopolysiloxane copolymers comprised of siloxane units as indicated by the formula $R^1{}_3SiO_{1/2}$ siloxane units as indicated by the formula $R^1{}_2HSiO_{1/2}$ and siloxane units as indicated by the formula $SiO_{4/2}$, organopolysiloxane copolymers comprised of siloxane units as indicated by the formula $R^1{}_2HSiO_{1/2}$ and siloxane units as indicated by the formula $SiO_{4/2}$, organopolysiloxane copolymers comprised of siloxane units as indicated by the formula $R^1HSiO_{2/2}$, siloxane units as indicated by the formula $R_1 SiO_{3/2}$, and siloxane units as indicated by the formula $HSiO_{3/2}$ and mixtures of two or more of these organopolysiloxanes. In the foregoing formulas, $R^1$ is a monovalent hydrocarbon group other than an alkenyl group, for example, an alkyl group such as a methyl group, an ethyl group, a propyl group, a butyl group, a pentyl group, a hexyl group or a heptyl group, an aryl group such as a phenyl group, a tolyl group, a xylyl group or a naphthyl group, an aralkyl group such as a benzyl group or a phenethyl group or a halogenated alkyl group such as a chloromethyl group, a 3-chloropropyl group or a 3,3,3-trifluoropropyl group.

The quantity of component (B) present in the composition of the present invention is in the range of 1 to 50 parts by weight per 100 parts by weight of component (A). The reasons for this are that the composition that is obtained does not harden sufficiently when the quantity of component (B) is less than 0.1 parts by weight per 100 parts by weight of component (A) and that the composition that is obtained does not harden sufficiently or that there are changes over time in the physical properties of the silicone rubber that is obtained when the quantity exceeds 50 parts by weight.

The organosiloxane, component (C), confers thixotropy on the composition and inhibits precipitation of fine alumina powder that is packed in large amounts. It is also the component that facilitates uniform redispersion of the fine alumina powder even if the fine alumina powder precipitates. Component (C) contains at least one alkoxy group that is bonded with a silicon atom or at least one hydroxyl group that is bonded with a silicon atom in the molecule. The alkoxy group that is bonded with the silicon atom in component (C) may be, for example, a methoxy group, an ethoxy group, a propoxy group or a butoxy group, with a methoxy group being particularly desirable. The group that is bonded with the silicon atom in component (C) may also be, for example, an alkyl group such as a methyl group, an ethyl group, propyl group, a butyl group, a hexyl group or an octyl group, an alkenyl group such as an allyl group or a hexenyl group, an aryl group such as a phenyl group, a tolyl group or a xylyl group, an halogenated alkyl group such as a 3,3,3-trifluoropropyl group or a 3-chloropropyl group, a functional organic group such as a 3-glycidoxypropyl group, a 3-methacryloxypropyl group, a 3-aminopropyl group or a N-(2-aminoethyl)-3-aminopropyl group, an alkoxysilyl alkyl group such as a trimethoxysilyl ethyl group or a methyidimethoxysilyl ethyl group or a hydrogen atom bonded with silicon. The molecular structure of component (C) may be, for example, of a straight chain form, of cyclic form, or a branched chain form or of a straight chain form having some branches. It may also be a mixture of two or more of these molecular structures. Although there is no limit on the molecular weight of component (C), because sufficient thixotropy can be conferred on the composition, it should have a degree of polymerization of a dimer or greater and its viscosity at 25° C. should be in the range of 3 to 2,000 centipoise.

Component (C) consisting of an alkoxy group bonded to a silicon atom can be a partially hydrolyzed condensate comprised of one or two or more alkoxysilanes such as, for example, tetramethoxysilane, tetraethoxysilane, tetraisopropoxysilane, methyl trimethoxysilane, methyl triethoxysilane, dimethyl dimethoxysilane, vinyl trimethoxysilane, methylvinyl dimethoxysilane, methylphenyl dimethoxysilane, phenyl trimethoxysilane, phenyl trimethoxysilane, trimethyl methoxysilane, 3,3,3-trifluoropropyl trimethoxysilane, 3-glycidoxypropyl trimethoxysilane, 3-glycidoxypropylmethyl dimethoxysilane, 3-methacryloxypropyl trimethoxysilane, 3-methacryloxypropylmethyl dimethoxysilane, 3-aminopropyl trimethoxysilane, 3-aminopropyl triethoxysilane and N-(2-aminoethyl)-3-aminopropyl trimethoxysilane. This partially hydrolyzed condensate is, for example, a methyl polysilicate, an ethyl polysilicate or an organosiloxane oligomer as indicated by the following formula:

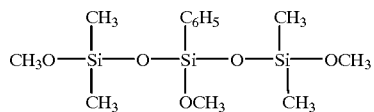

Further, component (C) that contains an alkoxy group bonded with a silicon atom can be, for example, an organosiloxane as indicated by the general formula

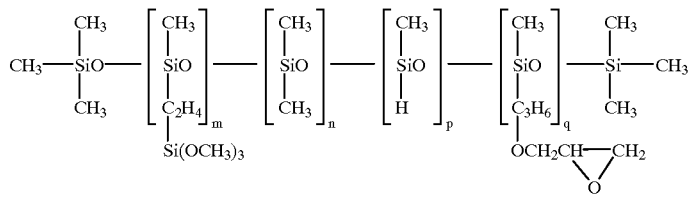

wherein, m is an integer of 1 or greater and n, p, and q are, respectively, integers of 0 or greater, an organosiloxane as indicated by the general formula

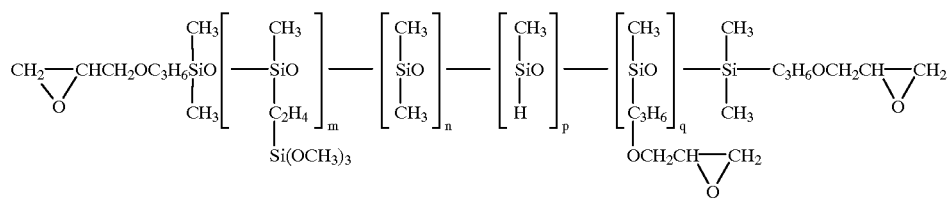

wherein, m is an integer of 1 or greater and n, p, and q are, respectively, integers of 0 or greater, or an organosiloxane as indicated by the general formula

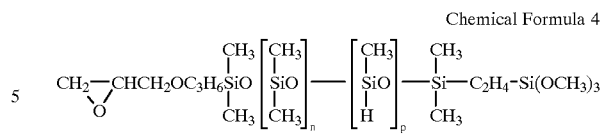

wherein, n and p are integers of 0 or greater. In addition, when component (C) contains a silicon-bonded hydroxy radical, the organosiloxane that comprises component (C) may include diorganosiloxane oligomers blocked with silanol groups at both terminals of the molecular chain such as, for example, dimethyl siloxane oligomers in which both terminals of the molecular chain are blocked with silanol groups, copolymer oligomers of dimethylsiloxane and methyl vinyl siloxane in which both terminals of the molecular chain are blocked with silanol groups, methylphenyl siloxane oligomers in which both terminals of the molecular chain are blocked with silanol groups and methylvinyl siloxane oligomers in which both terminals of the molecular chain are blocked with silanol groups.

The quantity of component (C) that is present in the composition of the present invention is in the range of 0.1 to 10 parts by weight per 100 parts by weight of component (A). The reasons for this are that there is deterioration of the stability of the composition obtained during storage when less than 0.1 parts by weight of component (C) is compounded per 100 parts by weight of component (A) and that the composition that is obtained undergoes gelation or hardens during storage or that the physical properties of the silicone rubber that is obtained deteriorate when the quantity compounded exceeds 10 parts by weight.

Component (D) is a fine alumina powder. It is the component that hardens the composition and confers high thermal conductivity on the silicone rubber that is obtained when the composition of the present invention is cured. Component (D) is comprised of (i) 5 to 95 wt % of spherical or nonspherical fine alumina powder of an average particle diameter of less than 10 μm and (ii) 95 to 5 wt % of spherical or nonspherical fine alumina powder of an average particle diameter of 10 to 50 μm. By combining alumina powder comprised of a mixture of these two types of powders with the aforementioned component (C) in this composition, precipitation of the fine alumina powder does not readily occur and redispersion of fine alumina powder that has precipitated is facilitated. In preferred embodiments of the present invention, the fine alumina powder of component (D) is treated with an organosilicon compound. Organosilicon compounds that can be used to treat the surfaces of the fine alumina powder include, for example, alkoxy silanes such as methyl trimethoxysilane, vinyl trimethoxysilane, vinyl triethoxysilane, 3-glycidoxypropyl trimethoxysilane, 3-methacryloxypropyl trimethoxysilane. 3-aminopropyl trimethoxysilane, 3-aminopropyl triethoxysilane and N-(2-aminoethyl)-3-aminopropyl trimethoxysilane, chlorosilanes such as methyl trichlorosilane, dimethyl dichlorosilane and trimethyl monochlorosilane, silazanes such as hexamethyl disilazane and hexamethyl cyclotrisilazane and siloxane oligomers such as dimethyl siloxane oligomer blocked with silanol groups at both terminals of the molecular chain, copolymer oligomers of dimethyl siloxane blocked with silanol groups at both terminals of the molecular chain and methyl vinyl siloxane, methylvinyl siloxane oligomer blocked with silanol groups at both terminals of the molecular chain and methylphenyl siloxane oligomer blocked with silanol groups at both terminals of the molecular chain. Suitable methods for treating the fine alumina powder with an organosilicon compound include, but are not limited to, the dry treatment method, in which the fine alumina powder and the organosilicon are directly mixed; the wet treatment method, in which, an organosilicon compound is first mixed with an organic solvent, such as toluene, methanol, or heptane, and then the organosilicon compound/organic solvent mixture is mixed with the fine alumina powder; a first insitu treatment method, in which the fine alumina powder is compounded in a mixture of component (A) and an organosilicon compound; and a second insitu treatment method, in which the fine alumina powder is first mixed with component (A) and then the powder/component (A) mixture is then mixed with an organosilicon compound.

The quantity of component (D) that is present in the present invention is in the range of 300 to 1200 parts by weight per 100 parts by weight of component (A). When the quantify of component (D) is less than 300 parts, the silicone rubber that results when the composition is cured does not have sufficient thermal conductancy. When the quantity is greater than 1,200 parts, the viscosity of the resulting composition is markedly increased and the handling workability is markedly decreased.

Component (E) is a hydrosilylation reaction catalyst. It is used to promote curing of the composition. Component (E) can be, for example, platinum catalysts such as fine platinum powder, platinum black, fine silica powder carrying platinum, activated carbon carrying platinum, chloroplatinic acid, platinum tetrachloride, alcohol solutions of chloroplatinic acid, complexes of platinum and olefins and complexes of platinum and alkenyl siloxanes such as divinyl tetramethyl disiloxanes, palladium catalysts such as tetrakis (triphenylphosphine) palladium; rhodium catalysts; and silicone resins containing these metallic catalysts; and thermoplastic resin powders of particle diameters of less than 10∓m such as polystyrene resins, nylon resins, polycarbonate resins.

The quantity of component (E) that is used in the present composition is a catalytic quantity. For example, the quantity of metal atoms in component (E) should be, in 10 terms of weight units, within a range of 0.1 to 500 ppm, and, preferably, within a range of 1 to 50 ppm, relative to component (A). The reasons for this are that the curing speed of the composition that is obtained is decreased when the quantity is less than 0.1 ppm. It is not economical for the quantity to exceed 500 ppm.

The composition of the present invention is prepared by uniformly mixing component (A) through component (E) as described above. Other optional components that can be used in this composition include, but are not limited to, inorganic fillers such as, for example, fumed silica, precipitative silica, titanium dioxide, carbon black, alumina, quartz powder, glass fibers and fillers obtained by subjecting these inorganic fillers to surface treatment with organosilicon compounds such as, organoalkoxysilanes, organochlorosilane and organosilazanes. It is desirable to compound a cure inhibitor for the purpose of improving the handling workability of the composition at room temperature. This cure inhibitor can be, for example, an alkyne alcohol such as, 3-methyl-1-butyne-3-ol, 3,5-dimethyl-1-hexyn-3-ol and 2-phenyl-3-butyn-2-ol, an enine compound such as, 3-methyl-3-penten-1 -yne and 3.5-dimethyl-3-hexen-1 -yne, 1,3,5,7-tetramethyl-1,3,5,7-tetravinyl cyclotetrasiloxane, 1,3,5,7-tetramethyl-1,3,5,7-tetrahexanyl cyclotetrasiloxane and benzotriazole. The quantity of these cure inhibitors that is compounded should be in the range of 10 to 50,000 ppm in terms of weight units relative to the composition. The composition of the present invention may also contain an organopolysiloxane that contains at least one silicon-bonded hydrogen atom or silicon-bonded alkenyl group, an organopolysiloxane that does not contain a silicon-bonded hydrogen atom or a silicon-bonded alkenyl group, a creep hardening inhibitor, a storage stabilizer, a heat resistance increasing agent, a flame retardant or colorants so long as the optional ingredients are present within ranges that do not impede the objectives of the invention.

There are no particular limitations on the methods of preparing the thermally conductive silicone rubber composition of this invention. For example, it can be prepared using mixing apparatus such as a "ROSS" mixer or a planetary mixer. "ROSS" is a registered trademark of Charles Ross and Son Company of Hauppauge, N.Y. The thermally conductive silicone rubber composition of this invention can form silicone rubber of high thermal conductivity. For example, they can be used as potting agents and adhesive agents for printed circuit boards and hybrid integrated circuits carrying such electronic components as transistors, integrated circuits and memory elements, as adhesive agents for semiconductor elements and as adhesive and sealing agents for engine mounts. Silicone rubber that is obtained by curing this thermally conductive silicone rubber composition can form these agents and can be used as heat release sheets.

EXAMPLES

Next, we shall present a detailed description of the thermally conductive silicone rubber composition of this invention by means of examples. Viscosity in the examples is the value determined at 25° C. The thixotropy of the thermally conductive silicone rubber composition was determined at the time of determination of viscosity with a simple cylindrical rotary viscometer (with the number of rotations of the rotary viscometer being varied) and is indicated by the ratio of the determined value for viscosity at each number of rotations (viscosity at 3 rpm/viscosity at 6 rpm). The storage stability of the thermally conductive silicone rubber composition was evaluated on the basis of the external appearance of the composition and remixing capacity after cold storage (10° C.) for 1 month. In order to assess the hardness of the silicone rubber, the thermally conductive silicone rubber composition was heated for 60 minutes at 150° C. and the hardness of the silicone rubber that was obtained was determined by means of a JIS A hardness meter as specified in JIS K 6301. The thermally conductivity of the silicone rubber was determined by heating the thermal conductive silicon rubber composition for 60 minutes at 150° C., with the silicone rubber that was obtained being determined with a Shortherm QTM (manufactured by Showa Denko Company, Ltd: non-steady heat ray method).

Example 1

A thermally conductive silicone rubber composition was prepared by uniformly mixing, with a Ross mixer, 100 parts by weight of dimethylpolysiloxane blocked with dimethylvinylsiloxane groups at both terminals of the molecular chain and of a viscosity of 100 centipoise, 5 parts by weight of copolymer of a viscosity of 5 centipoise comprised of dimethylsiloxane blocked with trimethylsiloxy groups at both terminals containing an average of three hydrogen bonds bonded with silicon atoms in the side chain of the molecular chain and of methylhydrogensiloxane, 1 part by weight of an organosiloxane oligomer of a viscosity of 12 centipoise having the formula

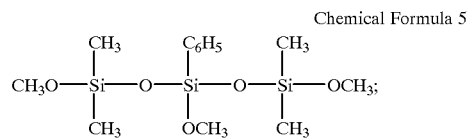

Chemical Formula 5

400 parts by weight of spherical fine alumina powder of an average particle diameter of 9 μm, 200 parts by weight of nonspherical fine alumina powder of an average particle diameter of 25 μm, 1,1 ,3,3-tetramethyl-1,3-divinyidisiloxane complex of platinum (the quantity of platinum metal atoms relative to dimethylpolysiloxane blocked with the aforementioned dimethylvinyl siloxane groups at both terminals of the molecular chain being 5 ppm) and 0.1 parts by weight of 2-phenyl-3-butyn-2-ol. Table 1 shows the storage stability of this thermally conductive silicone rubber composition and the thermal conductivity of the silicone rubber that was obtained by curing it.

Example 2

A thermally silicone rubber composition was prepared in the same way as in Example 1 except that 3 parts by weight of organosiloxane oligomer used in Example 1 was compounded. Table 1 shows the storage stability of this thermally conductive silicone rubber composition and the thermal conductivity of the silicone rubber that was obtained by curing it.

Example 3

A thermally conductive silicone rubber composition was prepared in the same way as in Example 1 except that 1 part by weight of a dimethylsiloxane oligomer of a viscosity of 40 centipoise in which both terminals of the molecular chain were blocked by silanol groups, having the formula

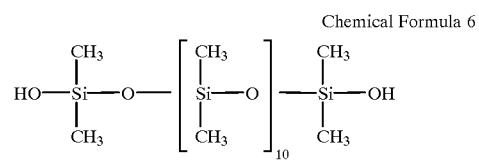

Chemical Formula 6 was compounded instead of the organosiloxane oligomer in Example 1. Table 1 shows the storage stability of this thermally conductive silicone rubber composition and the thermal conductivity of the silicone rubber that was obtained by curing it.

Comparative Example 1

A thermally conductive silicone rubber composition was prepared in the same way as in Example 1 except that the organosiloxane oligomer used in Example 1 was not compounded. Table 1 shows the storage stability of this thermally conductive silicone rubber composition and the thermal conductivity of the silicone rubber that was obtained by curing it.

Comparative Example 2

A thermally conductive silicone rubber composition was prepared in the same way as in Example 1 except that 600 parts by weight of nonspherical fine alumina powder of an average particle diameter of 25 μm was compounded instead of the 400 parts by weight of spherical fine alumina powder of an average particle diameter of 9 μm and the 200 parts by weight of the nonspherical fine alumina powder of an average particle diameter of 25 μm in Example 1. Table 1 shows the storage stability of this thermally conductive silicone rubber composition and the thermal conductivity of the silicone rubber that was obtained by curing it.

Comparative Example 3

A thermally conductive silicone rubber composition was prepared in the same way as in Example 1 except that 1 part by weight of 3-glycidoxypropyl trimethoxysilane was compounded instead of the organosiloxane oligomer used in Example 1. Table 1 shows the storage stability of this thermal conductive silicone rubber composition and the thermal conductivity of the silicone rubber that was obtained by curing it.

TABLE 1

|  |  | This Invention | | | Comparative Examples | | |
|---|---|---|---|---|---|---|---|
|  |  | Example 1 | Example 2 | Example 3 | Example 1 | Example 2 | Example 3 |
| Thermally conductive silicone rubber composition | | | | | | | |
| Viscosity | (poise) | | | | | | |
| Viscosity at 3 rpm | | 400 | 950 | 1050 | 180 | 230 | 170 |
| Viscosity at 6 rpm | | 260 | 760 | 700 | 160 | 190 | 150 |
| Thixotropy | | 1.5 | 1.4 | 1.5 | 1.1 | 1.2 | 1.1 |
| Storage stability | | There was a very slightly transparent liquid layer at the top and there was a very slight precipitated fine alumina powder layer at the bottom. | | | A transparent liquid layer at the top and a precipitated fine alumina powder layer at the bottom could be distinctly differentiated. | | |
| External appearance after cold storage for 1 month | | | | | | | |
| Remixing capacity | | The entire body could easily be mixed and the fine alumina powder layer that had precipitated in the bottom could easily be remixed. | | | The fine alumina powder layer that had precipitated at the bottom was extremely hard, for which reason uniform remixing was difficuit. | | |
| Silicone rubber | | | | | | | |
| Hardness | (JIS A) | 82 | 50 | 82 | 80 | 81 | 80 |
| Thermal conductivity (cal/cm.sec.° C.) | | $3.5 \times 10^{-3}$ | $3.5 \times 10^{-3}$ | $3.5 \times 10^{-3}$ | $3.5 \times 10^{-3}$ | $2.9 \times 10^{-3}$ | $3.5 \times 10^{-3}$ |

Example 4

A thermally conductive silicone rubber composition was prepared in the same way as in Example 1 except that 300 parts by weight of nonspherical fine alumina powder of an average particle diameter of 9 μm and 300 parts by weight of spherical fine alumina powder of an average particle diameter of 2 μm were compounded instead of the 400 parts by weight of spherical fine alumina powder of an average particle diameter of 9 μm and the 200 parts by weight of the nonspherical fine alumina powder of an average particle diameter of 25 μm in Example 1. Table 2 shows the storage stability of this thermal conductive silicone rubber composition and the thermally conductivity of the silicone rubber that was obtained by curing it.

Comparative Example 4

A thermally conductive silicone rubber composition was prepared in the same way as in Example 4 except that the organosiloxane oligomer used in Example 4 was not compounded. Table 2 shows the storage stability of this thermally conductive silicone rubber composition and the thermal conductivity of the silicone rubber that was obtained by curing it.

Example 5

A thermally conductive silicone rubber composition was prepared in the same way as in Example 1 except that 400 parts by weight of spherical fine alumina powder of an average particle diameter of 9 μm and 200 parts by weight of spherical fine alumina powder of an average particle diameter of 20 μm were compounded instead of the 400 parts by weight of spherical fine alumina powder of an average particle diameter of 9 μm and the 200 parts by weight of the nonspherical fine alumina powder of an average particle diameter of 25 μm in Example 1. Table 2 shows the storage stability of this thermally conductive silicone rubber composition and the thermal conductivity of the silicone rubber that was obtained by curing it.

Example 6

100 parts by weight of dimethylpolysiloxane of a viscosity of 100 centipoise in which both terminals of the molecular chain were blocked by dimethylvinylsiloxane groups, 5 parts by weight of hexamethyidisilazane and 1 part by weight of water were mixed in advance in a Ross mixer, after which 400 parts by weight of spherical fine alumina powder of an average particle diameter of 9 μm and 200 parts by weight of nonspherical fine alumina powder of an average particle diameter of 25 μm were mixed uniformly at room temperature. Next, the product was mixed while being heated at 150° C. at a reduced pressure of 10 mmHg, with such by-products as unreacted hexamethyl disilazane, water and ammonia being removed. Following that, it was cooled to room temperature and 5 parts by weight of a copolymer of a viscosity of 5 centipoise comprised of dimethylsiloxane that contains an average of 3 hydrogen atoms bonded with silicone atoms in the side chain of the molecular chain and in which both terminals of the molecular chain are blocked by trimethylsiloxane groups and of methylhydrogensiloxane, 1 part by weight of an organosiloxane oligomer of a viscosity of 12 centipoise, having the formula Chemical Formula 7

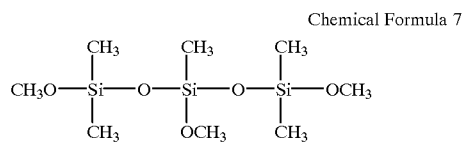

1,1,3,3-tetramethyl-1,3-divinyidisiloxane complex of platinum (the quantity of platinum metal atoms relative to dimethylpolysiloxane blocked with the aforementioned dimethylvinylsiloxane groups at both terminals of the molecular chain being 5 ppm) and 0.1 parts by weight of 2-phenyl-3-butyn-2-ol were mixed uniformly. Table 2 shows the storage stability of this thermally conductive silicone rubber composition and the thermal conductivity of the silicone rubber that was obtained by curing it.

TABLE 2

| | This invention | | | Comparative Examples |
|---|---|---|---|---|
| | Example 4 | Example 5 | Example 6 | Comparative Example 4 |
| Thermally conductive silicone rubber composition | | | | |
| Viscosity (poise) | | | | |
| Viscosity at 3 rpm | 360 | 390 | 380 | 170 |
| Viscosity at 6 rpm | 250 | 280 | 250 | 150 |
| Thixotropy | 1.4 | 1.4 | 1.5 | 1.1 |
| Storage stability | | | | |
| External appearance after cold storage for 1 month | There was a very slightly transparent liquid layer at the top and there was a very slight precipitated fine alumina powder layer at the bottom. | | | A transparent liquid layer at the top and a precipitated fine alumina powder layer at the bottom could be distinctly differentiated. |
| Remixing capacity | The entire body could easily be mixed and the fine alumina powder layer that had precipitated in the bottom could easily be remixed. | | | The fine alumina powder layer that had precipitated at the bottom was extremely hard, for which reason uniform remixing was difficult. |
| Silicone rubber | | | | |
| Hardness (JISA) | 82 | 81 | 81 | 81 |
| Thermal conductivity (ca/cm.sec.° C.) | $3.2 \times 10^{-3}$ | $3.3 \times 10^{-3}$ | $3.5 \times 10^{-3}$ | $3.2 \times 10^{-3}$ |

The thermally conductive silicone rubber composition of this invention is characterized in that the fine alumina powder does not readily precipitate in spite of the fact that a large quantity of fine alumina powder has been compounded for the purpose of forming silicone rubber of high thermal conductivity and in that the fine alumina powder can easily be uniformly redispersed even if it has precipitated.

That which is claimed is:

1. A thermally conductive silicone rubber composition, comprising
   (A) 100 parts by weight of an organopolysiloxane containing an average of at least two silicon-bonded alkenyl groups per molecule;
   (B) 0.1 to 50 parts by weight of an organohydrogenpolysiloxane containing an average of at least two silicon-bonded hydrogen atoms per molecule;
   (C) 0.1 to 10 parts by weight of an organosiloxane containing an average of at least one silicon-bonded radical per molecule wherein said radical is selected from the group consisting of hydroxyl and alkoxy groups;
   (D) 300 to 1200 parts by weight of a fine alumina powder comprising:
      (i) 5 to 95 parts by weight of a first fine powder having an average particle diameter that is less than 10 µm; and
      (ii) 95 to 5 parts by weight of a second fine powder having an average particle diameter from 10 to 50 µm;
      wherein said first fine powder and said second fine powder are individually selected from the group consisting of spherical and nonspherical fine powders; and
   (E) a catalytic quantity of a hydrosilylation reaction catalyst.

2. The thermally conductive silicone rubber composition according to claim 1, wherein component (D) has been subjected to surface treatment using an organosilicon compound.

3. The thermally conductive silicone rubber composition according to claim 1, wherein the silicon-bonded alkenyl groups of component (A) are individually selected from the group consisting of vinyl, allyl, butenyl, pentenyl, hexenyl, and heptenyl groups.

4. The thermally conductive silicone rubber composition according to claim 3, wherein the silicon-bonded alkenyl groups of component (A) are vinyl groups.

5. The thermally conductive silicone rubber composition according to claim 1, wherein the viscosity, at 25° C., of component (A) is from 10 to 500,000 centipoise.

6. The thermally conductive silicone rubber composition according to claim 5, wherein the viscosity, at 25° C., of component (A) is from 50 to 100,000 centipoise.

7. The thermally conductive silicone rubber composition according to claim 1, wherein the organohydrogenpolysiloxane of component (B) contains silicon-bonded organic groups which are individually selected from the group consisting of alkyl, aryl, aralkyl and halogenated alkyl groups.

8. The thermally conductive silicone rubber composition according to claim 7, wherein the silicon-bonded organic groups of the organohydrogenpolysiloxane of component (B) are individually selected from the group consisting of methyl and phenyl groups.

9. The thermally conductive silicone rubber composition according to claim 1, wherein the viscosity, at 25° C., of component (B) is from 1 to 500,000 centipoise.

10. The thermally conductive silicone rubber composition according to claim 9, wherein the viscosity, at 25° C., of component (B) is from 5 to 100,000 centipoise.

11. The thermally conductive silicone rubber composition according to claim 1, wherein the organosiloxane of component (C) contains an average of at least one silicon-bonded alkoxy group.

12. The thermally conductive silicone rubber composition according to claim 11, wherein the silicon-bonded alkoxy group of the organosiloxane of component (C) is selected from the group consisting of methoxy, ethoxy, propoxy and butoxy groups.

13. The thermally conductive silicone rubber composition according to claim 12, wherein the silicon-bonded alkoxy group of the organosiloxane of component (C) is a methoxy group.

14. The thermally conductive silicone rubber composition according to claim 1, wherein the viscosity, at 25° C., of the organosiloxane of component (C) is in the range of 3 to 2,000 centipoise.

* * * * *